(12) United States Patent
Caldwell (10) Patent No.: US 10,365,616 B2
(45) Date of Patent: Jul. 30, 2019

(54) PORTABLE SWITCHING DEVICE TO REMOTELY OPERATE A HIGH VOLTAGE CIRCUIT BREAKER

(71) Applicant: Eoin Caldwell, Limerick (IE)

(72) Inventor: Eoin Caldwell, Limerick (IE)

( * ) Notice: Subject to any disclaimer, the term of this patent is extended or adjusted under 35 U.S.C. 154(b) by 123 days.

(21) Appl. No.: 15/549,763

(22) PCT Filed: Feb. 8, 2016

(86) PCT No.: PCT/EP2016/052636
§ 371 (c)(1),
(2) Date: Aug. 9, 2017

(87) PCT Pub. No.: WO2016/128357
PCT Pub. Date: Aug. 18, 2016

(65) Prior Publication Data
US 2018/0032037 A1    Feb. 1, 2018

(30) Foreign Application Priority Data

Feb. 11, 2015   (GB) .................................. 1502266.8
Feb. 11, 2015   (IE) .................................. 52015/0031

(51) Int. Cl.
| | |
|---|---|
| *G05B 9/02* | (2006.01) |
| *H02B 3/00* | (2006.01) |
| *H02H 1/00* | (2006.01) |
| *H01H 9/02* | (2006.01) |
| *H01H 47/00* | (2006.01) |
| *H01H 47/22* | (2006.01) |

(52) U.S. Cl.
CPC .............. *G05B 9/02* (2013.01); *H01H 9/0235* (2013.01); *H01H 47/001* (2013.01);
(Continued)

(58) Field of Classification Search
CPC ........ G05B 9/02; H01H 47/001; H01H 47/22; H01H 9/0214; H01H 9/0235;
(Continued)

(56) References Cited

U.S. PATENT DOCUMENTS 4,390,926 A * 6/1983 Hart ........................ H02B 1/52
                                                            335/6
7,804,201 B1   9/2010 Ledbetter
(Continued)

OTHER PUBLICATIONS

Agilent Technologies, "Maximizing the Life Span of Your Relays," Jun. 11, 2002, pp. 1-4, XP55259395, retrieved from the Internet: URL:http://cp.literature.agilent.com/litweb/pdf/5988-5917EN.pdf.
(Continued)

*Primary Examiner* — William Hernandez
(74) *Attorney, Agent, or Firm* — Docket Clerk (57) ABSTRACT

A portable switching device to remotely operate a high voltage circuit breaker, the portable switching device is locally temporarily electrically connected to the controlling circuit of the high voltage circuit breaker and comprises: a voltage input (206); a voltage output (208, 210) for connecting to the external circuit; a ground input (212); an overvoltage protection circuit (201) connected between the voltage input (206) and the ground input (212); and a switching unit (203, 205) comprising a first switching circuit having an input connected to the voltage input and an output connected to the voltage output, the first switching circuit comprising a relay (2032), a relay contact protection circuit (2034), and an overload protection circuit (2036); wherein the first switching circuit is remotely controllable to switch the external circuit from a first operating state to a second operating state.

25 Claims, 5 Drawing Sheets

(52) U.S. Cl.
CPC ............... *H01H 47/22* (2013.01); *H02B 3/00* (2013.01); *H02H 1/0061* (2013.01); *H01H 9/0214* (2013.01); *H01H 47/00* (2013.01); *H01H 2231/032* (2013.01)

(58) Field of Classification Search
CPC .. H01H 9/0271; H01H 2231/032; H02B 3/00; H02H 1/0061
USPC ........................................................ 307/326
See application file for complete search history.

(56) References Cited

U.S. PATENT DOCUMENTS

| | | | |
|---|---|---|---|
| 8,006,371 B1 * | 8/2011 | Ledbetter | H02B 3/00 29/622 |
| 8,228,225 B1 * | 7/2012 | Ledbetter | H02B 3/00 200/50.24 |
| 8,471,718 B1 | 6/2013 | Miller et al. | |
| 2002/0117902 A1 * | 8/2002 | Evers | F24C 7/08 307/130 |

OTHER PUBLICATIONS

European Patent Office, International Search Report, Application No. PCT/EP20161052636, dated Apr. 7, 2016, 4 pages.
European Patent Office, Written Opinion of the International Searching Authority, Application No. PCT/EP2016/052636, dated Apr. 7, 2016, 7 pages.

* cited by examiner

PORTABLE SWITCHING DEVICE TO REMOTELY OPERATE A HIGH VOLTAGE CIRCUIT BREAKER

CROSS-REFERENCE TO RELATED APPLICATION

The present application is a United States nationalization under 35 U.S.C. § 371 of International Patent Application No. PCT/EP2016/052636, which claims priority to Great Britain Patent Application No. 1502266.8 and Irish Patent Application No. S2015/0031, both filed 11 Feb. 2015, and all of which are incorporated herein by reference for all purposes.

TECHNICAL FIELD

The present invention relates to switching control circuits

BACKGROUND ART

In an industrial setting operators, technicians or electricians open or close high voltage circuit breakers by pushing a close button or an open button on an electrical panel by manually actuating a button on the housing of the circuit breaker. However, switching of high or low voltage switchgear commonly leads to arc flashes or flashovers. The most common causes include human error, deterioration of equipment, damp, dust, corrosion, contamination, birds or rodents, underrated equipment or the like. Other causes include partial discharge of equipment. Arc flash temperatures can be up to 19,000° C. Temperatures of this magnitude lead to serious and often fatal injury. The presence of high temperature gases can cause internal burning if inhaled. In addition to the high temperatures vaporizing metals from an arc flash produces pressure and sound waves strong enough (approx. 140 dB) to project an operator or other workers in the vicinity of the arc flash across the room. Vaporised copper for example expands in volume up to 67000 times its original volume and with ionized gases exerts a physical pressure wave propagating from the arc flash event. Indeed these pressure and accompanying sound waves can also project tools and other equipment which may be molten due to the high flash temperatures. High magnetic forces are also present in the region of an arc flash which can propel ferrous or other debris at speeds up to and exceeding 700 mph.

In response to the dangers, where technicians or electricians are in danger personal protective equipment is worn. For example fire resistant pants, jackets, hood and gloves. However, sound waves generated can blow clothing and safety personal protective equipment from operators. In other situations the switchgear is wired to a control room. Other solutions include remote racking, containment units, monitoring of the system such that incident energy can be reduced to a safe level, non-vented panelling, closed door racking, magnetic switch actuators and the like. Many of these solutions are expensive and require replacing or retrofitting existing switchgear. Furthermore, rather than preventing arc flashes, the devices which merely remove the operator from the vicinity, such as the magnetic switch actuators, may be irreparably damaged. It is desirable to have a remotely switchable unit that can be connected to existing switch gear which allows an operator to switch high and low voltage circuit breakers safely and securely and at a safe distance from the switchgear. It is further desirable that this unit is portable and reusable such that it can be transported by the operator and reused with different equipment with ease.

SUMMARY OF INVENTION

The invention as described herein with reference to the appended claims comprises a portable switching device for switching an external circuit, comprising: a voltage input; a voltage output for connecting to the external circuit; a ground input; an overvoltage protection circuit connected between the voltage input and the ground input; and a switching unit comprising a first switching circuit having an input connected to the voltage input and an output connected to the voltage output, the first switching circuit comprising a relay, a relay protection circuit, and an overload protection circuit; wherein the first switching circuit is remotely controllable to switch the external circuit from a first operating state to a second operating state.

A portable switching device in accordance with the present invention allows an operator to remotely switch circuit breakers in a high or low voltage environment where an arc flash may result. The use of such a device allows the operator to be remote from such a switching circuit and thus minimizes risk.

It will be appreciated that the portable switching device in accordance with the present invention facilitates switching of circuit breakers where were not originally designed to be remotely switchable. The portable switching device may also be used to switch any electrical circuit, for example changing the status of the circuit from a first operating state to a second operating state. This further allows an operator to investigate and control the circuit that the portable switching unit is connected to, thus helping the operator to test the electrical circuit.

The switching unit may comprise a second switching circuit having an input connected to the voltage input and an output connected to the voltage output, the second switching circuit may further comprise a relay, a relay protection circuit, and an overload protection circuit, the first and second switching circuit being separately remotely controllable. The use of two switching units facilitates the expansion to control and open and closing circuit separately. It will be appreciated that the second switching circuit is optional.

The portable switching device may be arranged on a printed circuit board.

The external circuit may comprise a circuit breaker or control circuit and the first switching circuit may be arranged to control a closing coil of a circuit breaker or control circuit and the second switching circuit may be arranged to control an opening coil of a circuit breaker or control circuit.

The relay protection circuit of the first switching circuit or the second switching circuit may comprise an RC snubber circuit connected in parallel with a relay contact of the relay(s). The placement of the snubber across the power switching relay supresses voltage spikes and damps the ringing caused by circuit inductance when the relay/switch opens.

The relay of the first or second switching circuit may comprise an internal magnet configured for arc quenching. The magnet draws the arc into a chamber comprising an arc resistant material and thus cools the arc, increasing the resistance and reducing the arc currents to zero. The magnet which is positioned above the relays contacts creates a magnetic field. When the relay contacts open an arc is formed. The arc is drawn towards the magnetic field thus stretching the arc and pulling the arc towards the magnetic field thus weakening the arc and quenching or extinguishing the arc and preventing it from re-striking across the contacts.

The overvoltage protection circuit connected between the voltage input and ground input may comprise a PTC, a fuseable resistor, or a metal oxide varistor circuit in series between the voltage input and the ground input.

The overvoltage protection circuit may further comprise an electronic spark gap module.

The overload protection circuit of the first or second switching circuit may comprise a high rupturing current fuse.

The portable switching device may further comprise a receiver unit for receiving a wireless signal from a remote control unit.

The portable switching device may further comprise a controller for controlling switching of the external circuit from a first operating state to a second operating state in response to the received wireless signal.

The portable switching device may further comprise a master switch for enabling or disabling the portable switching device.

The portable switching device may be battery powered. The battery may be a 9V DC alkaline battery.

A further embodiment of the present invention includes a system comprising a portable switching device according to the above embodiment, and a remote control.

The remote control may comprise a wireless transmitter.

The wireless transmitter may be arranged to transmit a rolling code signal at 433 MHz or 315 Mhz. This may be licensed or unlicensed signal spectrum.

The first operating state may be a closed state and the second operating state may be an open state or wherein the first operating state may be an open state and the second operating state may be a closed state.

A further embodiment of the present invention includes a method of switching an external circuit using a portable switching device as described above, comprising
  connecting a voltage output of the external circuit to the voltage input of the portable switching device;
  connecting the first voltage output of the portable switching device to a switching terminal of the external circuit;
  connecting the ground input of the portable switching device to a ground of the external circuit and wherein switching the external circuit comprises remotely controlling the first switching circuit to switch the external circuit from a first operating state to a second operating state.

The switching unit may comprise a second switching circuit connected to a second switching terminal of the external circuit and activating the second switching circuit may switch the second switching terminal from a first operating state to a second operating state.

The first operating state may be a closed state and the second operating state may be an open state or wherein the first operating state may be an open state and the second operating state may be a closed state.

The external circuit may comprise a circuit breaker or control circuit and the first switching unit is arranged to control a closing coil of a circuit breaker or control circuit and the second switching unit is arranged to control an opening coil of a circuit breaker or control circuit.

The first and second circuit breaker or control circuit are independently controllable.

BRIEF DESCRIPTION OF DRAWINGS

The invention will be more clearly understood from the following description of an embodiment thereof, given by way of example only, with reference to the accompanying drawings, in which.

DESCRIPTION OF EMBODIMENTS

The system and apparatus described herein is designed with electricians, technicians, service engineers and plant operators, etc. in mind. Said system is useable to remotely switch high voltage circuit breakers and circuitry remotely. For example, with circuit breakers, the control circuit of these circuit breakers, which are generally fitted with closing and opening coils, can be remote from the control circuit, thus allowing operators to evacuate a danger zone around the circuit breakers and limit the dangers associated with arc flashes during opening and closing phases of the circuit breaker. Dangers zones such as an arc flash boundary, limited approach boundary, restricted approach boundary and prohibited approach boundary are generally predefined in the regions surrounding switching circuitry.

The system proposed herein is anticipated for use with voltages which ranging from zero volts ac to 220v ac/dc. In addition, the present invention is further anticipated for use with potential of higher short duration short duty cycle of up to 400 Vdc.

The system and apparatus proposed herein is suitable for switching a positive or live leg of a circuit at a rated voltage and current. For example, the voltage values may range from zero volts ac/dc to 220v ac/dc, and the current values may range from zero to 6 Amps continuous, and with momentary inrush current ranges of zero to ten amps.

Figure 1:
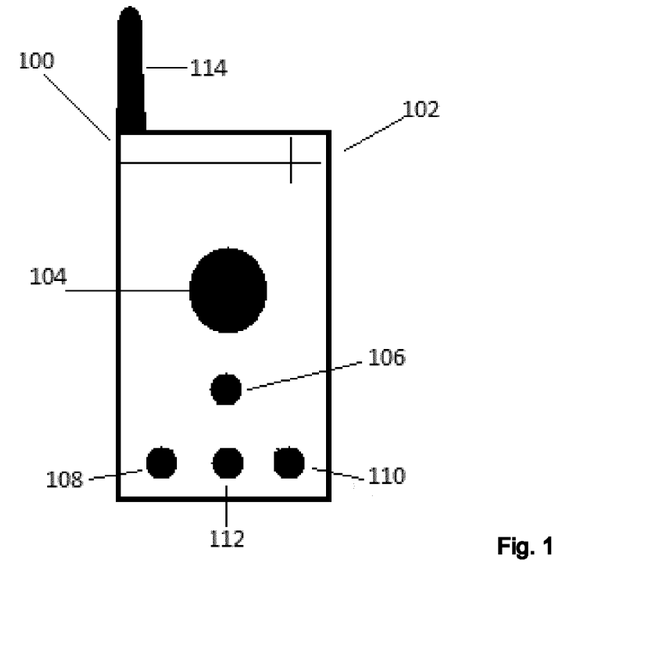
FIG. 1 illustrates a portable switching device in accordance with the present invention
Figure 2:
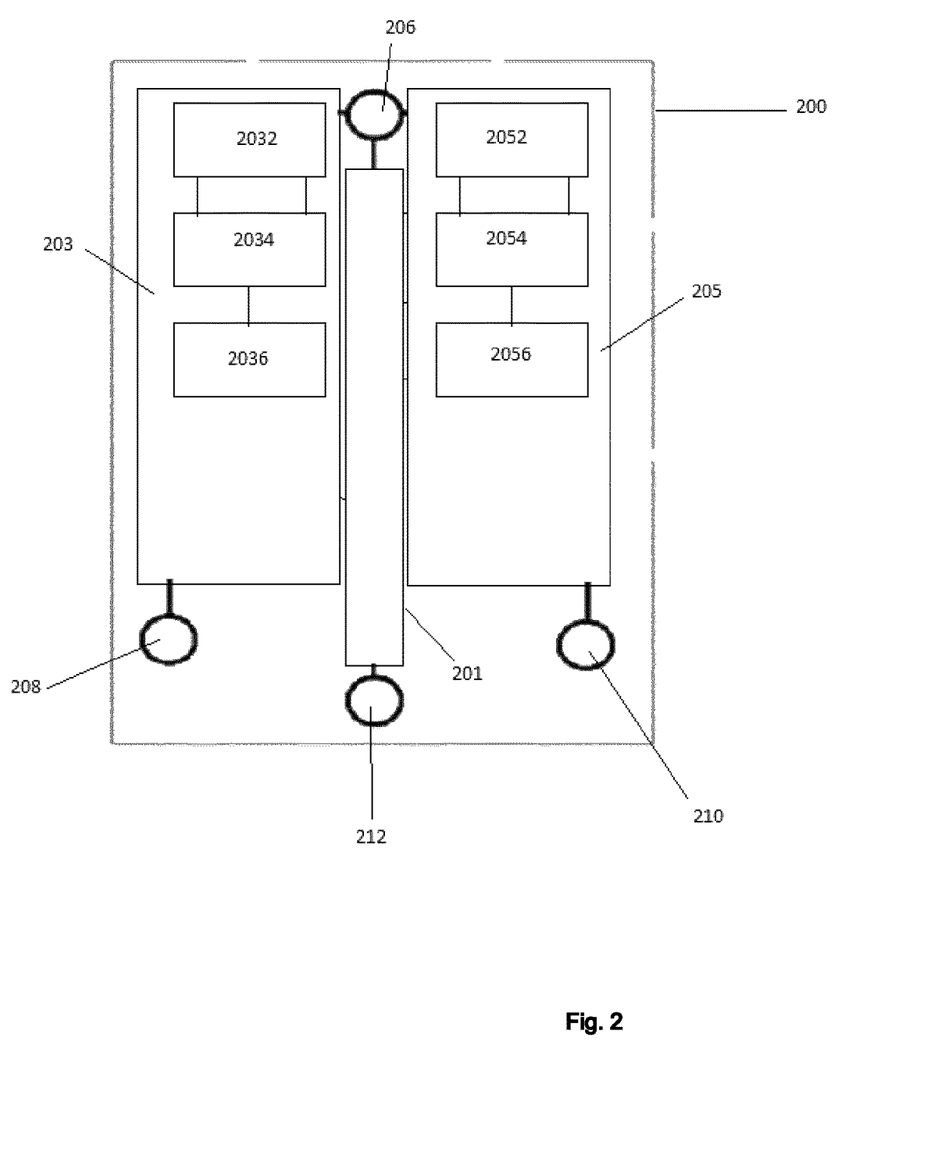
FIG. 2 illustrates a power circuit in accordance with the present invention
Figure 3:
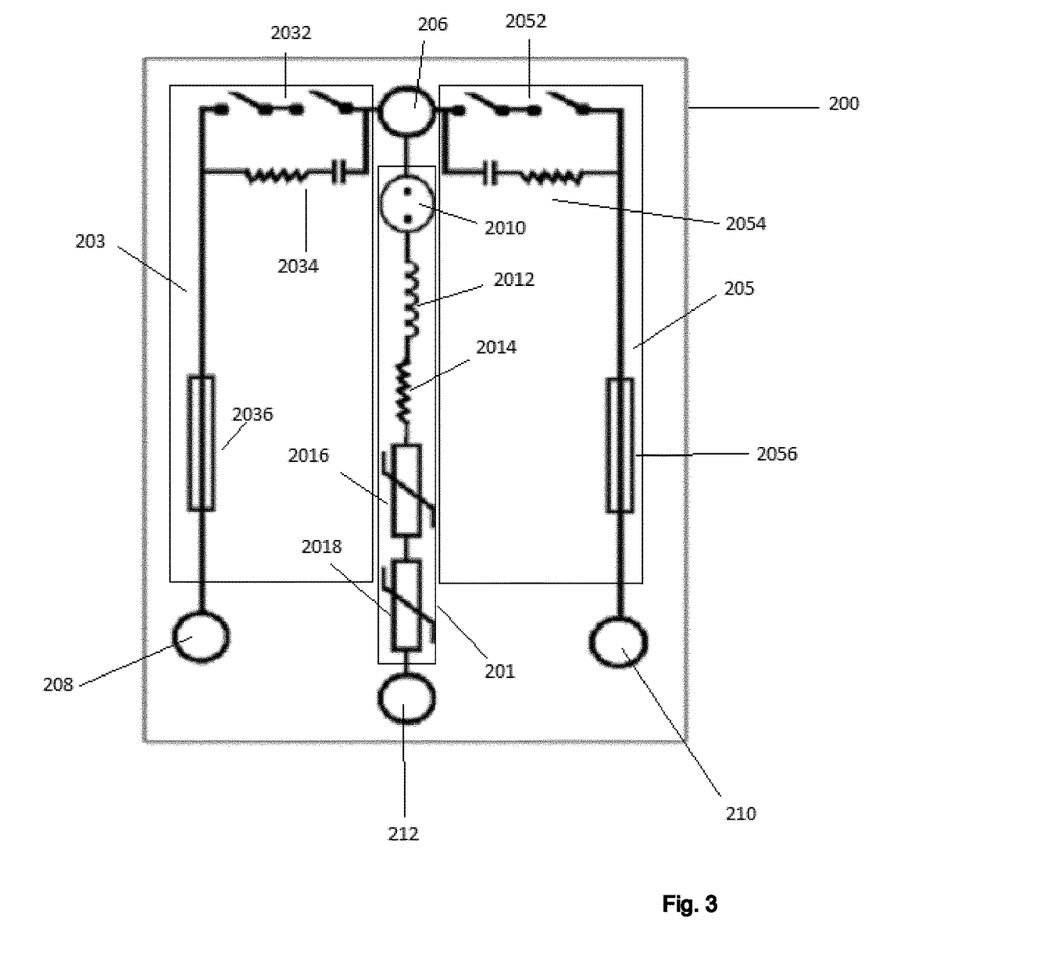
FIG. 3 is a circuit diagram of an embodiment of the power circuit of FIG. 2

A portable switching device 100 in accordance with a preferred embodiment of the present invention as illustrated in FIG. 1 comprises an outer casing 102 which houses a PCB (not shown) on which the circuitry is printed. Preferably the PCB is a four layer board where the power circuit shown in FIG. 2 is internally sandwiched between the four layers of the PCB, thus giving a higher dielectric strength and additional flash over protection to the power circuit. In an embodiment the power board is laid out in 4 layers of fr4 material. In this embodiment, the copper track conductor is inter-layered between the four layers of the fr4 material. The internal copper tracks and top layer pads having no Sharpe edges. Further all the corners are rounded off so to reduce the potential of tracking jumping across to the other conductor. It will be appreciated that this helps to increase the flash over protection to the power circuit.

In a preferred configuration of the printed circuit board:
Copper Layer 1 is the top copper and consist of surface component copper pads of 70 micro mm of copper which is covered in a solder mask is the top layer.

Fr4 material layer 1 consists of fr4 material

The next copper layer 2 is the internal copper track of 70 micro mil of copper shaped to reduce flash over potential between conductors tracks Fr4 material layer 2 consist of fr4 material Fr4 material layer 3 consist of fr4 material The next copper layer 3 is the internal copper track of 70 micro mil of copper shaped to reduce flash over potential between conductors tracks Fr4 material layer 4 consist of fr4 material Copper Layer 4 the bottom copper consist of surface component copper pads of 70 micro mil of copper which is covered in a solder mask is the top layer.

It will be appreciated that the above configuration is exemplary only and alternative layouts may be implemented.

The portable switching device outer casing of FIG. 1 has a master switch 104 disposed thereon. The master switch may be used to disconnect the portable switching circuit from a power source such as a battery or otherwise disable the portable switching circuit. The master switch may be a push button, a switch, a key lock which requires a key for activation, a keypad, which requires the input of an unlock code, a biometric scanner or the like. A common connector voltage input 106 is also provided which facilitates the connection of a common input voltage to the portable switching device. The casing also includes two circuit voltage output connectors 108, 110 which are in communication with the circuit voltage outputs of the portable switching device. Cables or other connection leads are connectable to these circuit voltage outputs as described below in relation to FIG. 5. It will be appreciated that a single circuit voltage output (108, 110) may be provided. The casing in this configuration includes only one circuit voltage output connector 108, which is in communication with the circuit voltage outputs of the portable switching device. Cables or other connection leads are connectable to the circuit voltage outputs as described below.

The portable switching device casing further comprises a circuit ground input 112 for facilitating connection of a ground connection with the ground connection of the portable switching device.

The portable switching device as shown in FIG. 1 also includes an antenna 114 for facilitating wireless communication. It will be appreciated that while in this figure the antenna is shown as a stub antenna, any other configuration of antenna may be implemented. In an embodiment, the portable switching device casing, and the inputs and outputs may be colour coded to facilitate operator use.

The casing of FIG. 1 is merely exemplary and alternative configurations may also be implemented wherein the inputs and outputs are reorganised or reoriented.

The portable switching device 200 encased in the device casing 100 includes a common voltage input 206, a circuit voltage output 208, and a second circuit output 210. It will be appreciated that these inputs and outputs are connectable to or accessible via the output and input connectors 106, 108, 110 of FIG. 1. A circuit guard or ground input 212 is also provided. This is connectable to the circuit ground input 112 of FIG. 1.

The portable switching device further includes a first switching unit 203. A second switching unit 205 is preferably also provided, however it will be appreciated that this second switching unit 205 is not essential. A single switching unit may be sufficient, but a user will necessarily have to alter the polarity of connections when using the portable switching device.

The switching units 203, 205 comprise a relay circuit for switching. The relay may be a power relay 2032, 2052 having two contacts in series. The power relay further comprises means for arc quenching. This means for arc quenching, in a preferred embodiment comprises an internal magnet.

The switching units 203, 205 further comprises a relay contact protection circuit 2034, 2054. In a preferred embodiment, the relay contact protection circuit comprises a RC snubber circuit 2034, comprising a resistor in series with a capacitor. The resistor is preferable a ceramic power resistor. In one configuration the snubber resistor value is 2.2k ohm 5 watt. The capacitor is preferably an interference suppression capacitor, for example a X type capacitor, and preferably a X1 type capacitor. The switching units 203, 205 further comprise an overload protection circuit 2036, 2056. This overload protection circuit, in one configuration comprises a fuse. This fuse is preferably a high rupture capacitance current fuse. This fuse may be rated for example to 1000V.

The portable switching device further comprises an overvoltage protection circuit 201. In a preferred configuration, the overvoltage protection circuit comprises an optional electronic spark gap module 2010. The overvoltage protection circuit further comprises a resistor 2012. Preferably this resistor is a fuseable resistor. The circuit 201 further comprises a positive temperature coefficient (PTC) resistor 2014 and one or more metal oxide varistors 2016, 2018. High voltage slots are cut into the pcb board to give an air gap and a higher dielectric effect between the connections posts on the components on overvoltage circuit between the common input and the guard input. The optional electronic spark gap, resistor, PTC and varistor(s) are arranged in series between the input 206 and ground 212.

Figure 4:
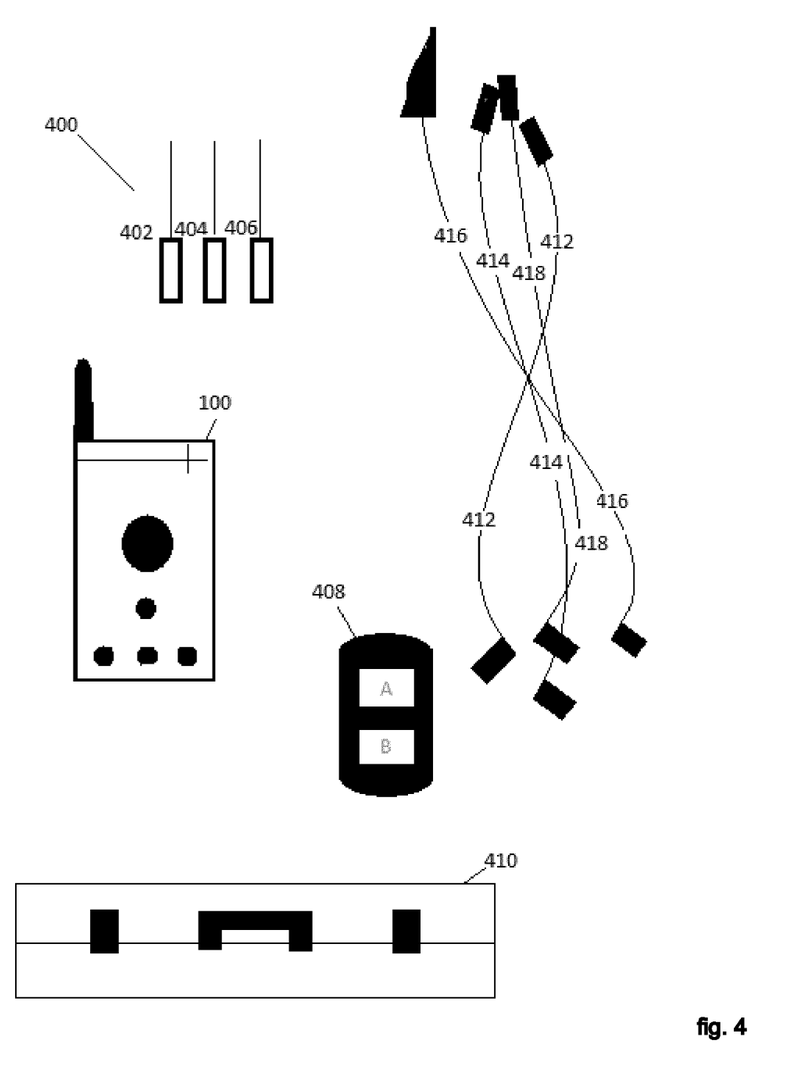
FIG. 4. embodies a portable system in accordance with the present invention

An exemplary system including the portable switching device 200 and casing 100 optionally includes a suitcase 410 for transporting the portable switching device. In addition, the exemplary system includes a key fob 408 for remotely activating the switching circuitry of the portable switching device. One or more buttons A, B may be provided. Where two buttons are provided, pressing the first button (A) may activate the first switching circuit 203 and pressing the second button (B) may activate the second switching circuit 205, or vice versa. Where a single switching circuit is provided only a single button would be necessary for activating the circuitry. Similarly a single button key pad may be provided to activate either the first or second switching circuit.

The keyfob, when activated, transmits a signal to a receiver unit on the portable switching device. In a preferred configuration the signal provided comprises a rolling code at either 433 MHz or 315 MHz.

A battery, such as a 9V battery, is used to power the portable switching device 100. The portable switching device includes a compartment (not shown) for containing the battery.

The system also includes connecting cables 412, 414, 418 for connecting the portable switching device to the control circuitry or circuit breaker to be switched, as described below. Connection pads or connectors 402, 404, 406 are connectable to the common connector input 106 and the circuit voltage outputs on the portable switching device. The connectors 402, 404 and 406 may be colour coordinated with the inputs and outputs on the portable switching device 100. Similarly connecting cables may be additionally or alternatively colour coordinated. For example, red, green, green and yellow, and black may be used to coordinate connections.

For example, a black connector/cable may be connected to the common voltage input 104. The opposite end of the cable may be then connectable to a common voltage on a circuit to be switched or a circuit breaker. A red connector/cable may be connected to the circuit voltage output 108. The opposing end of this connector/cable may then be connectable to an open coil of the circuit breaker or circuit to be switched for example. A green connector may be connected to the circuit voltage output 110 of the second switching unit. The opposing end of this connector cable is then connectable to a closed coil of the circuit breaker or circuit to be switched. A green and yellow connector can be connected to the ground input 112. The opposing end of this connector is connectable to ground.

In one configuration the test leads are 1000v 19A CATT III. The connectors may be screw type insulated flexible copper rated for 1000v 32A CATT II which are screw connectors. Connectors may be screw fit, pressure fit, clamps or similar. A silicon rubber jacket (not shown) may be provided defining and enveloping the extremities of the portable switching device. For example this silicon rubber jacket may cover the sides and rear of the portable switching device such that only a faceplate of the switching device is visible. A customisable faceplate may be used to on the portable switching device. This faceplate may be colour coordinated, and/or may include text to assist in operating the portable switching device. A guard test cable 416 is also provided for connecting the portable switching device to circuit ground.

Preferably the portable switching device and the corresponding casing described above is arranged to be entirely portable. The device is readily carried by hand to the location of use. In one configuration the unit weight approximately 620 grams, for example. It will be appreciated that the weight is not restricted as such and the figure above is exemplary only. As an example only, the dimensions of the portable switching device may be 90 mm width, 60 mm depth and 180 mm height.

While the portable switching device described above is outlined as a stand-alone unit it will be appreciated that the functionality and system described herein may be integrated into a multimeter, clampmeter, mobile test equipment such as a voltage and current injection tester and the like.

Usage of an Apparatus in Accordance with the Present Invention.

A preferable, but optional step in the use of the portable switching device in accordance with the present invention is to perform an initial safety check.

Initial Safety Check

Performing the initial safety check comprises inspecting the portable switching device 200 and casing for visible damage such as for example removing the silicon rubber jacket to check for cracks in the casing or exposed PCB. Connectors and connection cables should also be checked to ensure correct operation.

In an embodiment to test the inputs of the portable switching device, a multimeter is connected between the common voltage input and the circuit voltage output 108, 208 of the first switching unit 203. The multimeter in such a configuration is set to a continuity function. The first switching unit is then activated (by pressing the relevant button on the keyfob 408 for example). Similarly, the second switching unit 205 can be tested by connecting the common voltage input 206 and the circuit voltage output 210 of the second switching unit 205. In an embodiment, a bell or other audible alarm sounds to indicate that the portable switching device has been activated. For example, the audible alarm can sound when the switching circuit is activated and will stop when deactivated. The audible alarm may be used as an indication of a fault. For example an incorrect operation of or nonoperation of the alarm may indicate that the switching circuit is damaged, for example relay contacts are welded closed.

Testing Relay Contact Protection

As previously indicated the switching units 203, 205 further comprise a relay contact protection circuit 2034, 2054. In a preferred embodiment the relay contact protection circuit comprises a RC snubber circuit 2034 comprising a resistor in series with a capacitor. The resistor is preferable a ceramic power resistor. In one configuration the snubber resistor value is 2.2k ohm 5 watt. The capacitor is preferably an interference suppression capacitor, for example a X type capacitor, and preferably a X1 type capacitor. The switching units 203, 205 further comprise an overload protection circuit 2032, 2056. This overload protection circuit, in one configuration comprises a fuse. This fuse is preferably a high rupture capacitance current fuse. This fuse may be rated for example to 1000V. An outcome of such a test for example is to check that the capacitor value is as expected. First a multimeter is set to a capacitance function and the multimeter is connected to the portable switching device across the common connector 206 and the relevant circuit voltage output 208, 210. The relevant circuit voltage output is selected depending on which switching circuit 203, 205 is being tested. The capacitance value recorded will indicate if there is a fault with the contact protection circuit. For example if the multimeter reads 2.2 µF with a general tolerance of ±15% then a 1.9 µF capacitor would be seen to function correctly.

Testing Overvoltage Protection Circuit.

To test the overvoltage protection circuit 2036, 2056 a multimeter is set to a resistance function. The multimeter is connected across the common voltage input and the ground input. In such a configuration the resistance seen by the multimeter is expected to be very high and indeed beyond a mega ohm range which may not be measurable by some multimeters. If the resistance seen by the multimeter is very low or zero this is indicative of an error with the overvoltage protection circuits. These may have been damaged by a very high transient voltage, for example a switching surge or lightning.

Testing Leads and Connectors.

Where cabling and connectors are provided these are also examined for damage to leads, such as tears, rips or exposed strands of copper.

Connecting the Portable Switching Device to a Circuit Breaker or Other Switching Arrangement.

Figure 5:
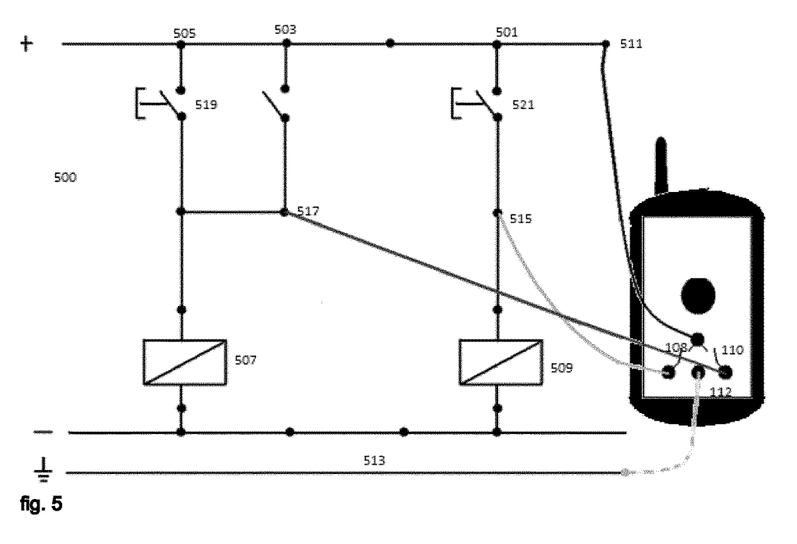
FIG. 5. describes a first connection configuration for switching an external control circuit in accordance with the present invention.

While described herein with reference to a circuit breaker having an open coil and a close coil it will be appreciated that this is exemplary only and not restricted as such. FIG. 5 shows a possible switching arrangement. The switching arrangement comprises a circuit breaker opening circuit having an opening button 519 and an opening coil 507. The switching arrangement also includes a circuit breaker closing circuit 501 having a closing button 521 and a closing coil 509.

In a first arrangement a common voltage 511 of circuit breaker 500 is connected to the common voltage input of the portable switching device 106, 206. For example, this may be implemented using a black cable.

The circuit voltage output 108, 208 of the first switching circuit is connected to a terminal 515 of the closing circuit 501. For example, this may be implemented using a green cable.

The circuit voltage output 110, 210 of the second switching circuit is connected to a terminal 517 of the opening coil 507. This may be implemented using a red cable for example.

The ground input 112, 212 is connected to an earth/ground of the switching arrangement.

Closing and Switching of a Racking Circuit/Circuit Breaker with a Portable Switching Device
 a. The portable switching device should preferably be tested as outlined above.
 b. When connecting the circuit as outlined in relation to FIG. 5, the portable switching device should be powered off, using the master power switch, for example.
 c. The circuit breaker should be racked in to a normal service position. It will be appreciated that the operator should do this while wearing the protective clothing.
 d. The portable switching device should then be switched on and the operator should leave the danger zone
 e. To close the racking circuit the closing circuit 501 which is connected to the first switching circuit 203 of the portable switching device 200 is activated remotely. It will be appreciated that with an opposite connection to that described in relation to FIG. 5 the second switching circuit 205 of the portable switching device may be activatable to close the racking circuit.
 f. Preferably, all other personnel and equipment should also be removed from the danger zone.
 g. The portable switching device is then remotely activated as indicated above using the remote control or key-fob or the like.
 h. The portable switching device can then be removed and tested as indicated above.

Opening and Switching of a Racking Circuit/Circuit Breaker with a Portable Switching Device
 a. The portable switching device should be tested as outlined above.
 b. When connecting the circuit as outlined in relation to FIG. 5, the portable switching device should be powered off, using the master power switch, for example.
 c. The circuit breaker should be racked in to a normal service position. It will be appreciated that the operator should do this while wearing the protective clothing.
 d. The portable switching device should then be switched on and the operator should leave the danger zone
 e. To open the racking circuit the opening circuit 505 which is connected to the first switching circuit 205 of the portable switching device 200 is activated remotely. It will be appreciated that with an opposite connection to that described in relation to FIG. 5 the first switching circuit 203 of the portable switching device may be activatable to close the racking circuit.
 f. Preferably, all other personnel and equipment should also be removed from the danger zone.
 g. The portable switching device is then remotely activated as indicated above using the remote control or keyfob or the like.

The methods outlined above can also be implemented in closing or opening and switching of a removable circuit breaker or a fixed circuit breaker as outlined above.

The invention is not limited to the embodiments hereinbefore described but may be varied in both construction and detail.

The words "comprises/comprising" and the words "having/including" when used herein with reference to the present invention are used to specify the presence of stated features, integers, steps or components but does not preclude the presence or addition of one or more other features, integers, steps, components or groups thereof. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A portable switching device for switching an external circuit, comprising:
    a voltage input;
    a voltage output for connecting to the external circuit;
    a ground input;
    an overvoltage protection circuit connected between the voltage input and the ground input; and
    a switching unit comprising a first switching circuit having an input connected to the voltage input and an output connected to the voltage output, the first switching circuit comprising a relay, a relay contact protection circuit, and an overload protection circuit;
    wherein the first switching circuit is remotely controllable to switch the external circuit from a first operating state to a second operating state.

2. The portable switching device according to claim 1, wherein the switching unit comprises a second switching circuit having an input connected to the voltage input and an output connected to the voltage output, the second switching circuit further comprising a relay, a relay protection circuit, and an overload protection circuit, the first and second switching circuits being separately remotely controllable.

3. The portable switching device according to claim 2 wherein the external circuit comprises a circuit breaker or control circuit and the first switching circuit is arranged to control a closing coil of the circuit breaker or control circuit and the second switching circuit is arranged to control an opening coil of the circuit breaker or control circuit.

4. The portable switching device according to claim 2 wherein the relay contact protection circuit of the first switching circuit or the second switching circuit comprises an RC snubber circuit connected in parallel with a relay contact of the relay(s).

5. The portable switching device according to claim 2 wherein the relay of the first or second switching circuit comprises an internal magnet configured for arc quenching.

6. The portable switching device according to claim 2 wherein the relay comprises two contacts in series.

7. The portable switching device according to claim 2 wherein the overload protection circuit of the first or second switching circuit comprises a high rupturing current fuse.

8. The portable switching device according to claim 1 wherein the portable switching device is arranged on a printed circuit board.

9. The portable switching device according to claim 1 wherein the overvoltage protection circuit connected between the voltage input and ground input comprises a PTC, a fuseable resistor, or a metal oxide varistor circuit in series between the voltage input and the ground input.

10. The portable switching device according to claim 9 wherein the overvoltage protection circuit further comprises an electronic spark gap module.

11. The portable switching device according to claim 1 further comprising a receiver unit for receiving a wireless signal from a remote control unit.

12. The portable switching device according to claim 11 further comprising a controller for controlling switching of the external circuit from the first operating state to the second operating state in response to the received wireless signal.

13. The portable switching device according to claim 1 further comprising a master switch for enabling or disabling the portable switching device.

14. The portable switching device according to claim 1 wherein the device is battery powered.

15. The portable switching device according to claim 14 wherein the device is powered by a 9V DC alkaline battery.

16. A system comprising a portable switching device and a remote control, the portable switching device comprising:
 a voltage input;
 a voltage output for connecting to an external circuit;
 a ground input;
 an overvoltage protection circuit connected between the voltage input and the ground input; and
 a switching unit comprising a first switching circuit having an input connected to the voltage input and an output connected to the voltage output, the first switching circuit comprising a relay, a relay contact protection circuit, and an overload protection circuit;
 wherein the first switching circuit is remotely controllable to switch the external circuit from a first operating state to a second operating state.

17. The system according to claim 16 wherein the remote control comprises a wireless transmitter.

18. The system according to claim 17 wherein the wireless transmitter is arranged to transmit a rolling code at 433 MHz or 315Mhz.

19. The system according to claim 16 wherein the first operating state is a closed state and the second operating state is an open state or wherein the first operating state is an open state and the second operating state is a closed state.

20. The system according to claim 16 further comprising a casing for the portable switching device.

21. A method of switching an external circuit using a portable switching device, comprising:
 connecting a voltage output of the external circuit to a voltage input of the portable switching device;
 connecting a first voltage output of the portable switching device to a switching terminal of the external circuit; and
 connecting a ground input of the portable switching device to a ground of the external circuit and wherein switching the external circuit comprises remotely controlling a first switching circuit to switch the external circuit from a first operating state to a second operating state.

22. The method according to claim 21 wherein the portable switching device comprises a second switching circuit connected to a second switching terminal of the external circuit, the method comprising activating the second switching circuit to switch the second switching terminal from a first operating state to a second operating state.

23. The method according to claim 22 wherein the external circuit comprises a circuit breaker or control circuit and the first switching circuit is arranged to control a closing coil of the circuit breaker or control circuit and the second switching circuit is arranged to control an opening coil of the circuit breaker or control circuit.

24. The method according to claim 22 wherein the first and second switching circuits are independently controllable.

25. The method of switching the external circuit according to claim 21 wherein the first operating state is a closed state and the second operating state is an open state or wherein the first operating state is an open state and the second operating state is a closed state.

\* \* \* \* \*